Nov. 15, 1927.
J. G. SWAIN
1,649,772
WHEEL AND DEMOUNTABLE RIM
Filed Sept. 22, 1921
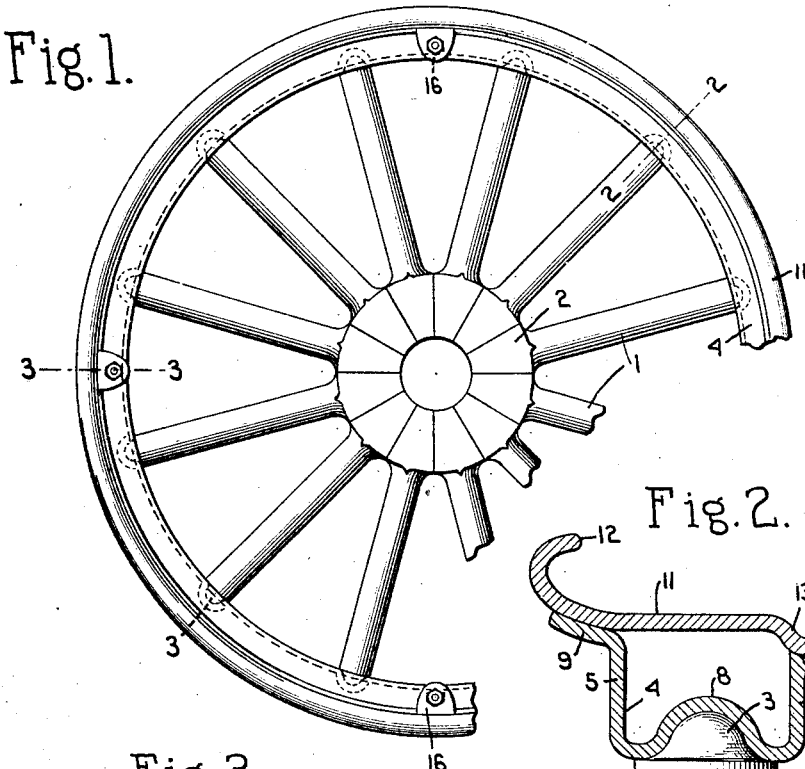
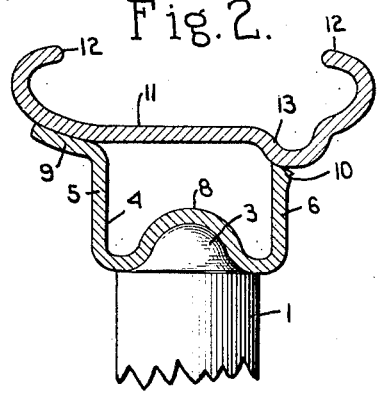
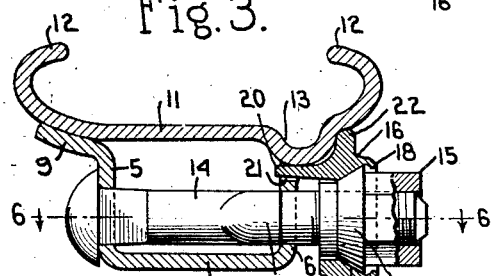
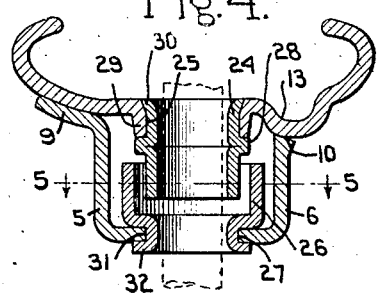
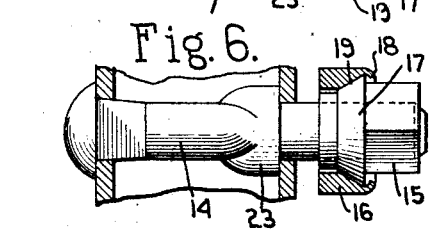
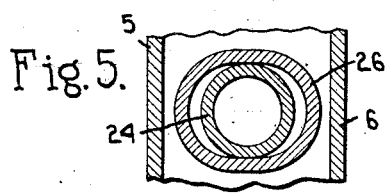
*INVENTOR.*
Joseph G. Swain
BY 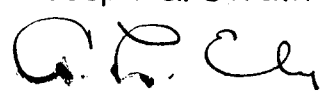
*ATTORNEY.*

Patented Nov. 15, 1927.

1,649,772

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL AND DEMOUNTABLE RIM.

Application filed September 22, 1921. Serial No. 502,328.

This invention relates to wheels for automobiles or similar vehicles in which there is employed a demountable rim for carrying a pneumatic tire, the object of the invention being to construct a light and inexpensive equipment which will satisfactorily serve the purpose to which it is put and which will be easy to manufacture and to operate.

Another purpose of my invention is to perfect a rim and felloe construction which can be rolled up out of flat stock, so that special hot rolled sections will not be required.

A further object of my invention is to combine a demountable rim with a steel felloed wheel to make a light, strong and easily operated unit. As an additional object, the construction of the means for locking the rim and the wheel from relative circumferential movement has been simplified and the clamping lugs have been improved.

Other objects and advantages will appear as the description proceeds, it being understood that the showing is for the purpose of enabling one skilled in the art to practise the invention and is not for the purpose of limiting the invention to the exact form shown.

In the drawings:

Fig. 1 is a side elevation of a wheel with the demountable rim thereon.

Fig. 2 is a cross section through the felloe and rim taken at the spoke on the line 2—2 of Fig. 1.

Fig. 3 is a cross section through the felloe and rim taken at a clamping lug on the line 3—3 of Fig. 1.

Fig. 4 is a cross section at the valve stem opening.

Fig. 5 is a section on the line 5—5 of Fig. 4.

Fig. 6 is a section on the line 6—6 of Fig. 3.

The wheel forming a part of the combination of this invention is formed of a plurality of wooden spokes 1, the inner ends 2 of which are mitered to form the hub of the wheel and the outer ends of which are formed with reduced rounded knobs 3.

The felloe or fixed rim is indicated by the numeral 4 and is rolled up from a strip of flat steel so as to have two parallel flanges 5 and 6. The base 7 of the felloe is formed with a number of pressed out sockets or cavities 8 in which the ends 3 of the spokes are seated. The wheel is usually or preferably formed by expanding the steel felloe to a greater circumference than its finished size, the spokes are assembled by placing the ends 3 in the sockets 8 and the steel rim is then compressed or upset upon the spoke ends, which action serves to seat the knobs 3 in the sockets and to force the mitered ends of the spokes together to form the hub.

One flange 5 of the steel felloe or fixed rim is formed with an outwardly bent flange or seat 9, which inclines upwardly to form a seat for one side of the rim. The other flange 6 is somewhat lower than the flange 5 and is formed with an inclined or tapered rim seat 10.

The demountable tire carrying rim is indicated as a whole by the numeral 11, being provided with two tire securing flanges 12. In the form shown, the flanges 12 are of a type designed to hold a clincher tire, but it will be understood that the invention is not limited to a clincher tire carrying rim.

One side of the rim 11 seats on the ledge or flange 9, while the other side is formed with a continuous rolled gutter or depression 13, which seats on the tapered surface 10 of the flange 6. By rolling the gutter or depression 13 in the flat stock, I am enabled to mount the tire carrying rim on the flanges of unequal height, without using a special steel section, the rim being rolled up out of flat stock.

To hold the tire rim in place on the steel felloe, or fixed rim, I employ a number of bolts 14 which pass transversely through the two flanges of the steel felloe, the outer end of each bolt being screw threaded and receiving a nut 15. On the nut 15 is loosely mounted the side clamp or lug 16, the nut and clamp being rotatively mounted with respect to one another but prevented from separation by a rib or enlargement 17 which is received within a downwardly turned flange or socket 18 on the clamp. The inner surface of the rib 17 is tapered or cone shaped as shown at 19 and the inner surface of the socket on the lug is correspondingly tapered. In actual practise there is some play between the clamp and the nut so that there is a slight rocking motion of the clamp on the bolt. The inner surface of each clamp is provided with a tongue or projection 20 which enters into a notch 21 of a greater depth than thickness of the tongue, cut in the upper surface of the flange 6 and on the upper portion of the clamp is formed a shoulder 22, the outer surface of which bears against the tire carrying rim at about the base of the gutter where it is pressed down from the rim. The surface of the clamp between the shoulder 22 and the tongue 20 is rounded so as to pass over the gutter, but not necessarily fit thereagainst. The bolt 14 may be provided with lugs or shoulders 23 which bear against the inner face of the flange 6 and prevent it from being bent over toward the flange 5. The tongue 20 is provided to perform a guiding function in keeping the clamp moving in a straight line inwardly as the nut 15 is tightened on the end of the bolt, and the notch permits rocking movement of the clamp on the nut.

In order to prevent circumferential movement of the tire rim on the steel felloe or fixed rim, I propose to use a thimble or sleeve 24 which is received in the valve stem hole 25 in the rim and mates with a second thimble or sleeve 26 received in the valve stem hole 27 on the felloe or fixed rim. The two sleeves mate in the manner shown in Fig. 4, and serve as drivers for the rim and also as protectors for the valve stem.

The sleeve 24 is made from steel tubing and jammed or crimped to form a shoulder or ridge 28 which seats against the lower edge of the flange 29, which is struck downwardly from around the valve stem hole. The upper edge of the sleeve 24 is pressed downwardly around the valve stem hole 25 as at 30 which locks the sleeve in position.

The sleeve 26 on the felloe or fixed rim is formed with a depression or groove 31, in which the edge of the steel felloe is received and the lower end of the sleeve is crimped outwardly as at 32 to lock the sleeve in position.

As shown in Fig. 5 the sleeve 24 may be round in cross section, while the upper end of the sleeve 26 may be elliptical with its long axis placed transversely of the felloe. The purpose of this particular arrangement is that while the rim is locked against circumferential movement about the wheel, a certain amount of relative lateral movement is permitted. The lateral movement of the tire rim aids in seating the rim on the wheel and in the demounting thereof.

While the description has been detailed and accurate, it will be understood that changes and modifications may be permitted within the scope of the invention and within the broad limits of the appended claims.

Claims:

1. In a wheel construction, a wheel felloe formed from a continuous metal strip having parallel flanges and a base, a demountable tire carrying rim on the felloe, and means to drive the rim comprising two mating sleeves adapted to house the valve stem, one of said sleeves being secured to the rim and the other to the base of the felloe, one of said sleeves being of greater width than the other transversely of the felly whereby circumferential displacement of the rim and felloe is prevented, but lateral rocking of the rim is allowed.

2. In a wheel construction a steel felloe and a demountable rim seated thereon, and means adapted to house the valve stem and drive the rim comprising a sleeve secured to the rim and projecting inwardly thereof and a sleeve secured to the felloe and projecting outwardly therefrom and mating with the first named sleeve, one of said sleeves being circular and the other elongated transversely of the wheel.

3. In a wheel having a rim adapted to receive a pneumatic tire and a hollow metallic felloe, a valve stem protector, comprising a sleeve secured within the valve stem aperture of the rim and projecting inwardly therefrom, and a second sleeve secured within an aperture in the base of the felloe and having an enlarged outwardly extending portion adapted to receive the first mentioned sleeve, said enlarged portion of said second sleeve being elongated transversely of the felloe to permit removal of the rim and fitting closely upon said rim sleeve to form a driving connection therewith.

4. In a wheel construction, the combination of a fixed wheel rim comprising a hollow metallic felly, a demountable tire carrying rim, said felly and rim being provided with aligned holes to receive the valve stem, a sleeve secured within the valve stem hole on the tire carrying rim and a second sleeve secured within the hole on the felly, the said sleeves telescoping to form a driving connection for the felly and rim.

5. In a wheel having a rim adapted to receive a pneumatic tire and a hollow metallic felloe, a valve stem protector comprising a sleeve secured within the valve stem receiving aperture of the rim and projecting inwardly therefrom, and a second sleeve secured within an aperture in the base of the felloe and having an enlarged outwardly extending portion within the felloe adapted to receive the first mentioned sleeve, said first-mentioned sleeve terminating short of the base of the felloe, said interfitting sleeves forming a driving connection between the felloe and rim.

JOSEPH G. SWAIN.